United States Patent [19]

Müller

[11] Patent Number: 4,547,714
[45] Date of Patent: * Oct. 15, 1985

[54] LOW MAGNETIC LEAKAGE FLUX BRUSHLESS PULSE CONTROLLED D-C MOTOR

[75] Inventor: Rolf Müller, St. Georgen, Fed. Rep. of Germany

[73] Assignee: Papst-Motoren GmbH & Co. KG, St. Georgen, Fed. Rep. of Germany

[ * ] Notice: The portion of the term of this patent subsequent to Jan. 31, 2001 has been disclaimed.

[21] Appl. No.: 567,527

[22] Filed: Jan. 3, 1984

Related U.S. Application Data

[63] Continuation of Ser. No. 220,181, Dec. 23, 1980, Pat. No. 4,429,263, which is a continuation-in-part of Ser. No. 60,879, Jul. 26, 1979, abandoned.

[51] Int. Cl.⁴ .................................................. H02K 29/02
[52] U.S. Cl. .................................... 318/254; 318/138; 310/68 R
[58] Field of Search .............. 318/138, 254, 254 A, 318/439; 310/68 R

[56] References Cited

U.S. PATENT DOCUMENTS

| | | | |
|---|---|---|---|
| 3,124,733 | 3/1964 | Andrews | 318/138 |
| 3,482,156 | 12/1969 | Porath | 318/138 |
| 3,679,953 | 7/1972 | Bedford | 318/138 |
| 3,805,134 | 4/1974 | Osamu et al. | 318/254 |
| 3,831,071 | 8/1974 | Mitsui | 318/254 |
| 3,840,761 | 10/1974 | Müller | 310/49 R |
| 3,845,339 | 10/1974 | Merkle | 318/254 X |
| 3,914,631 | 10/1975 | Guzman et al. | 310/75 |
| 3,930,190 | 12/1975 | Liska | 318/254 |
| 3,938,014 | 2/1976 | Nakajima | 318/138 |
| 4,005,347 | 1/1977 | Erdman | 318/254 |
| 4,011,475 | 3/1977 | Schmider | 318/254 X |
| 4,074,173 | 2/1978 | Janssen | 318/138 |
| 4,099,104 | 7/1978 | Muller | 318/439 X |
| 4,242,608 | 12/1980 | Ishigaki et al. | 318/254 X |
| 4,275,339 | 6/1981 | Burke et al. | 318/138 |
| 4,429,263 | 1/1984 | Muller | 318/254 |

FOREIGN PATENT DOCUMENTS

| | | | |
|---|---|---|---|
| 0040484 | 11/1981 | European Pat. Off. | 318/254 |
| 2239167 | 2/1974 | Fed. Rep. of Germany . | |
| 0042205 | 4/1977 | Japan | 318/254 |
| 0153211 | 12/1979 | Japan | 318/254 |
| 0062060 | 5/1981 | Japan | 318/254 |
| 0091670 | 7/1981 | Japan | 318/254 |
| 0033962 | 2/1983 | Japan | 318/254 |

Primary Examiner—William M. Shoop, Jr.
Assistant Examiner—Bentsu Ro
Attorney, Agent, or Firm—Theodore J. Koss, Jr.

[57] ABSTRACT

To reduce a unidirectional leakage flux emanating from a two-filament, pulse-energized motor, the stator (21, 22) is constructed at least as a four-pole stator and each filament (40, 41) of the windings (45; 74, 75, 78, 79) associated with respective stator poles is wound on the stator core elements (21) such that the number of North poles and South poles arising at the circumference of the core elements, upon energization by a current source (48, 49) of the respective filaments, will be identical, and the sum of the magnetic flux due to the energization of the respective filament arising, for example, at the center or shaft of the motor, will be essential zero, so that the effect of unidirectional, pulsating leakage flux upon a galvano-magnetic sensor (16) or other magnetic apparatus, e.g. magnetic tape transducing devices, will be essentially eliminated.

22 Claims, 13 Drawing Figures

LOW MAGNETIC LEAKAGE FLUX BRUSHLESS PULSE CONTROLLED D-C MOTOR

This application is a continuation of application Ser. No. 220,181 filed Dec. 23, 1980 and now U.S. Pat. No. 4,429,263 granted Jan. 31, 1984, which in turn was a continuation-in-part of application Ser. No. 060,879 filed July 26, 1979 and since abandoned.

The present invention relates to a pulsed d-c brushless motor, and more particularly to a motor suitable as an external rotor motor with dual-filament or dual-conductor windings, and having an at least approximately cylindrical air gap.

The present application hereby incorporates by reference the entire description and drawings of commonly owned application Ser. No. 060,879 filed July 26, 1979, abandoned.

BACKGROUND AND PRIOR ART

Various types of d-c brushless permanent magnet rotor motors are known. In order to provide for commutation of current flow through the respective windings of the motor, in dependence on position of the rotor, it has been proposed to use a galvano-magnetic sensor, for example a Hall generator or the like which supplies control signals, connected via amplifiers to controlled switches, typically transistors, which in turn control current flow through the respective filaments or conductors of the stator windings. Usually, the galvanomagnetic sensor is located approximately in the region of the gap between stator poles or their pole shoes. They are thus subject to stray or leakage magnetic flux from the stator or its pole shoes. A motor of this type is described, for example, in U.S. Pat. No. 4,099,104, MÜLLER, assigned to the assignee of the present application.

The aforementioned referenced U.S. Pat. No. 4,099,104 describes a two-pole external rotor motor. For some applications it is desirable to have motors with a large number of poles than two. Such motors can be constructed in flat form, to take up little space, with only small high-frequency oscillations above their nominal speed. It has been found that, when constructing motors of the type described with more than two poles, the stator windings, in operation, generate substantial stray leakage fluxes which act on the galvano-magnetic sensor such that its output signal is changed and that the switching speed of the amplifiers connected thereto may be detrimentally affected. Such change in the characteristics of the output signal thus is undesired. Such motors should, preferably, have a switching speed which is not too high in order to provide for smooth running and to eliminate radio interference, so that the pulses flowing through the stator windings will not be close to square wave shape but rather have flattened flanks, that is, to switch the motor currents ON and OFF somewhat gradually or "softly". Stray leakage flux may also lead to difficulties in starting or affect magnetically sensitive utilization apparatus, such as magnetic tape transducing systems.

The Invention

It is an object to improve d-c brushless pulsed motors using a rotor position sensor, which may be a galvanomagnetic sensing element, so that the sensor or other adjacent magnetically sensitive apparatus will not be affected by undesired stray field flux, without, however, departing from the compact construction which is one of the main advantages of such a motor.

Briefly, the stator is constructed to be at last a four-pole stator, in which each filament or conductor of the respective windings associated with respective stator poles is wound on stator core elements such that the number of North poles and South poles, arising at the circumference of the core elements upon energization of the respective filament, is identical, and sum of the magnetic flux due to this energization of the respective filament is essentially zero. The effect of leakage flux from the ends of adjacent pole shoes on the galvanomagnetic sensor, positioned in a gap between the pole shoes, then will be essentially eliminated.

The particular winding arrangement makes expensive shielding of magnetically sensitive apparatus, which includes magnetic sensing elements, unnecessary, and permits the compact construction of the motor. Such motors are used, for example, for ventilators and fans for electronic apparatus and the like, and also to drive transducing apparatus, for example magnetic tape transducing apparatus, particularly where compact construction and uniformity of rotational speed is important, for example in video tape transducing systems.

The motor 12 (FIGS. 1, 2) is a four-pole collectorless, that is, brushless external rotor motor having two filaments or conductor paths arranged for pulse energization. The cross-referenced article by Dr. Ing. Müller explains various types of motors, including the general type shown in FIGS. 1 and 2. In operation, motor 12 will operate, for example, at 1500 rpm. But when applied as a Direct-Hard-Disk-Drive the motor will operate at 5000 rpm or more. It has an external rotor bell 13 in which a four-pole permanent magnet 14 is positioned. Preferably, the magnet 14 is a rubber magnet, that is, a mixture of hard ferrite material and elastic material which is adhesively connected to the bell 13. The ring 14 is magnetized in trapeze form—see FIG. 8—and has narrow gaps 15 between its poles. The pole gaps 15 are skewed with respect to the axis of rotation, that is, they extend in spiral direction longitudinally—that is, in the direction of the axis of rotation. A typical skew angle is about 15°. The extent of offset or skew should be at least equal to the width of the gap between adjacent pole shoes of the stator. In the region of the galvano-magnetic rotor position sensor the rotor pole gaps 15 are about twice as wide as in the motor operating region, in order to obtain a lower steepness of the flanks of the trapeze-shaped magnetization. The rotor position sensor 16, forming a galvano-magnetic element, typically and usually, is a Hall generator; other magnetically responsive elements can be used, such as magnetic field plates, magnetically responsive diodes, or the like.

A sleeve 17 (FIG. 1) is butt-welded to the bell 13, in which a shaft 18 is positioned, the sleeve being kept in position by a C-ring 19 seated in a groove in the shaft 18. The shaft is secured in the sleeve by a press fit. The shaft 18 is journalled on the device to be driven, for example a film camera, but it could likewise be journalled on the stator 22 in any suitable manner, see for example the referenced U.S. Pat. No. 4,099,104, FIG. 2 thereof. The sleeve 17 and the shaft 18 have been omitted from FIG. 2 of this application for clarity of illustration.

Figure 2:
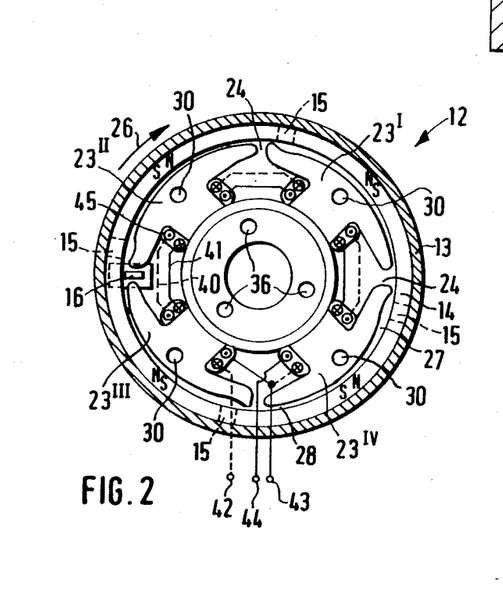
FIG. 2 is a section along line II—II of FIG. 1 and illustrating a first arrangement of windings in which stray field are eliminated.

The stator 22 is a laminar assembly having stator lamination 21 shaped to form four poles $23^I$ to $23^{IV}$. The poles $23^I$ to $23^{IV}$ are separated by pole gaps 24. The indices I to IV refer to the quadrants in which the poles are positioned. The stator poles, collectively denoted 23, have the customary T-shape. The external circumference of the pole shoes is specially constructed to generate a reluctance torque. The illustration of the present application does not permit exact representation of this stator shape in a scale of about 1:1, and reference is made to German Pat. No. 2,346,380, which describes and illustrates the shape in detail. FIG. 2, particularly stator pole $23^{IV}$, can be used as the best illustration: Looking in the direction of rotation represented by the arrow 26, the air gap 27 increases continuously over about 10° (mechanically), then decreases during the followin 65° to 80° (mech.) to the minimum 28, at the end of the respective pole shoe. A further varied shape may be such that beyond a minimum the air-gap gradually increases again to the subsequent gap 24 during 10° to 20° (mech.). Other air gaps may be used, for example as described in German Patent Disclosure Document DE-OS No. 29 19 581. All stator poles are identical. The particular shape results in a reluctance torque, in operation which is approximately complementary to the electromagnetically generated torque and thus supplements the electromagnetic torque. The present invention is not limited to this particular shape of the stator circumference; this shape of stator circumference, however, is particularly desirable when used in motors in accordance with the present invention.

Figure 1:
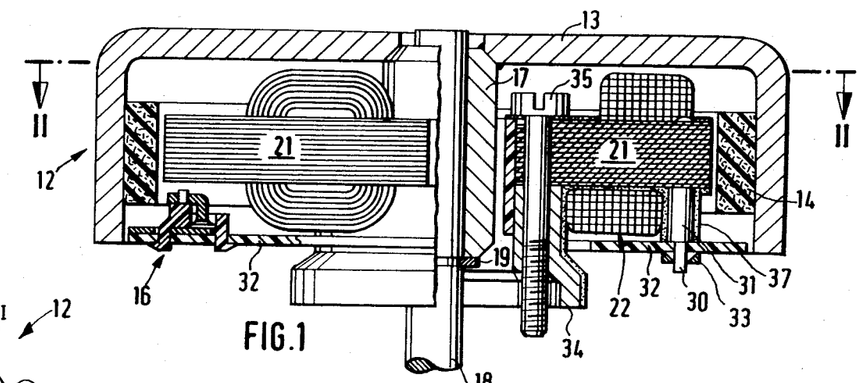
FIG. 1 is a highly schematic vertical view of a motor, in which the left half is in elevation and the right half in vertical section, to an enlarged scale.

Four pins 30, of which only one is shown in FIG. 1, and suitable spacers 31 secure a circular plate 32 of insulating material to the stator lamination stack. Plate 32 supports a printed circuit (see FIG. 4) on which the connections of the galvano-magnetic sensor 16, the filaments or conductors of the stator windings, and other components, are secured. The plate 32 is attached to the pins 30 by push-on interference washers 33, pressed on the pins 30. Sensor 16 also is secured to the plate 32.

A structural support element 34 is located beneath the stator lamination stack 21, which is adapted to receive a suitable counter element, the entire assembly then being secured together by screws 35, of which only one is shown in FIG. 1, passing through holes 36 in the stator stack 1. The entire stator lamination stack is protected against corrosion and to provide for isolation particularly in the grooves and gaps between the stator by a suitable protective coating 37, for example a sintered coating applied by whirl-sintering.

All the stator poles are wound, in accordance with a preferred embodiment and as shown in FIG. 2, with two continuous, that is mechanically not interrupted conductors, in bifilar form. The poles are sequentially wound, with alternating direction or sense of windings with respect to sequential poles. Winding the poles in bifilar manner has the advantage that the number of turns per filament on any one pole winding will be identical. It is also possible to wind the stator poles with windings placed adjacent or above each other. At elevated operating voltages, it is preferred to use separate windings to provide for insulation even though, then, the advantages of bifilar windings cannot be realized.

Figure 3:
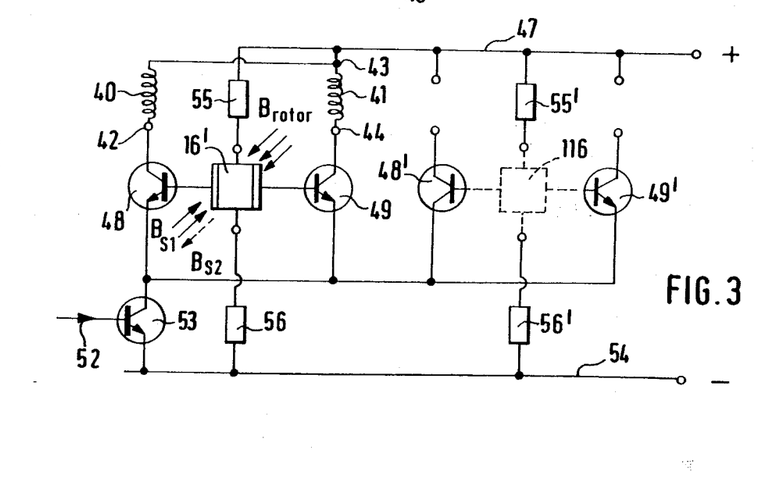
FIG. 3 is a schematic diagram of a circuit useful for energization of the motor.

The filaments, preferably a continuous conductor extending from pole to pole, are shown at 40, 41, in which the filament 40 is shown in broken lines, and the filament 41 in solid lines. Filament 40 has one terminal 42. The other terminal, as shown, is connected with an end of the filament 41 and to a terminal 43. The other end of the filament 41 is connected to a terminal 44. FIG. 3, showing the schematic diagram, shows the terminals of the respective filaments 40, 41. The current direction in the respective windings 45 on the stator poles, when energized by the circuit of FIG. 3, are shown in customary notation, that is, with a point for current coming from the plane of the drawing, and a cross for current going into the plane of the drawing. Let it be assumed that the filament 40 is energized. The pole $23^I$ will be a South pole, the pole $23^{IV}$ a North pole, and so on, alternatingly. Upon energization of the filament 41, the pole $23^1$ will become a North pole, the pole $23^{II}$ a South pole, and so on, alternatingly.

FIG. 3 illustrates a suitable control circuit. The control circuit as shown in FIG. 3 can be designed for a four-filament, four-pulse brushless d-c motor and, if used with a two-filament motor, only the left half of the circuit is connected or used. The circuit thus can be compatible for both two-filament as well as four-filament brushless d-c motors. This has the advantage that stocking of replacement printed circuit boards and similar elements is substantially simplified since the same unit can be used for different kinds of motors.

The joint terminal 43 of the two filaments 40, 41 is connected to a positive bus 47; terminals 42, 44, respectively, are connected to the collector of a respective npn transistor 48 49, the emitters of which are connected together and to the collector of an npn transistor 53, the emitter of which is connected to the negative or reference bus 54. Transistor 53 can be used for solid-state ON and OFF connection of the circuit, or can be used as an analog controlled element by having its base terminal 52 connected to a control circuit to control speed and/or power, that is, current flow of the motor.

A rotor position sensing element 16 controls commutation, that is, respective conduction of the transistors 48, 49. The sensor 16 is a Hall generator 16', the outputs of which are connected to the bases of the transistors 48, 49, respectively. The Hall generator 16' is energized over resistors 55, 56 connected to buses 47, 54. The portion of the circuit with the elements with prime notation is not used in connection with the system as shown in FIG. 2, but permits use of the same circuit in a four-filament four-pulse motor without any changes in the circuit, or its operation; a second Hall generator 16" will then be used to control commutation of the transistors 48', 49'.

Figure 4:
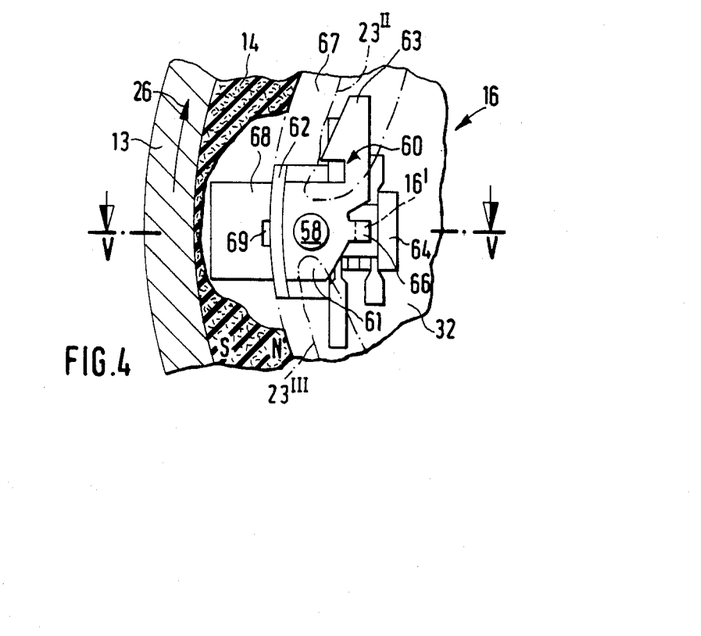
FIG. 4 is a fragmentary top view, partly in section, to an enlarged scale, and illustrating the arrangement of the galvanomagnetic sensing element on the motor.
Figure 5:
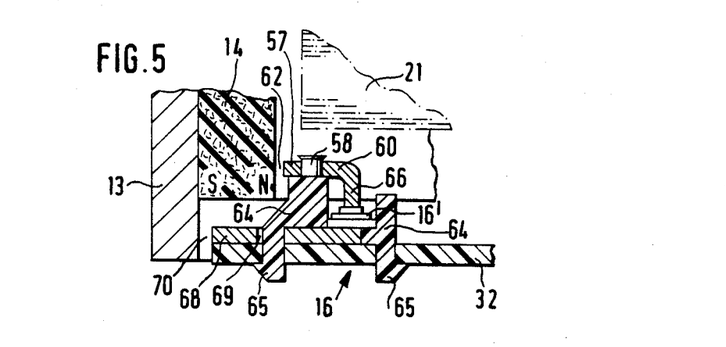
FIG. 5 is a section along line V—V of FIG. 4.

The rotor position sensor 16, and its arrangement within the motor is seen to an enlarged scale in FIGS. 4 and 5, to which reference will be made. The sensor 16 is located in the gap between the pole shoes of the adjacent stator poles $23^{II}$ and $23^{III}$ and shown in FIG. 4 in chain-dotted lines to illustrate the relative position of the element 16 with respect to the ends of the stator poles.

The Hall generator 16' is fitted in a plastic molding 64 (FIG. 5) which has resilient snap-in legs 65 fitting into matching holes of the insulating support plate 32. The plastic molding 64 carries two magnetic flux conductors which apply magnetic flux from the rotor magnet 17 to the Hall generator 16'. A first flux conductor 60, positioned at the top side of the Hall generator 16', is an angled element, made of material having soft iron characteristics, for example a soft-iron sheet element It has a narrow end 66 which extends vertically downwardly over the Hall generator 16'. It is fitted into the plastic molding 64 and secured thereto by a projecting pin 58 of the plastic molding which fits through an opening 57 in the flux guide element 60. After fitting the pin 58 into the hole 57, it is deformed under heat and then holds the element 60 securely. The flux guide element 60, in plan view, has the shape best seen in FIG. 4. Starting from the portion 66 which is directed to the Hall generator 16', the element 60 widens to about 4 to 5 times the width of the portion 66 and then extends with an upper flat portion 61 in the direction of the rotor magnet 14. It is separated from the rotor magnet 14 by an air gap 62. In the direction of rotation of the motor—as indicated by arrow 26 (FIG. 4)—the flux guide element 60 is formed with a tapering extension 63, separated by an air gap 67 from the magnet 14. The air gap 67 is wider than the air gap 62. The extension 63 is placed beneath the tip of the pole $23^{II}$, which thereby overlaps the flux guide element 60 to a greater extent than the preceding tip of the pole $23^{III}$, as shown in FIG. 4. In operation, therefore, the leakage flux from the pole $23^{II}$ has a greater influence on the sensor 16 than the leakage flux from the pole $23^{III}$.

A second flat flux guide element 68 is located beneath the Hall generator 16', likewise made of material of soft-iron characteristic, for example soft sheet iron, and secured between the plastic molding 64 and the plate 32. The left leg 65—with respect to FIG. 5—is fitted through an opening 69 of the flux guide element 68 and retains it thereby in position. The flux guide element 68 extends through the Hall generator 16' until just up to the inner circumference of the lower edge of the rotor bell 13, being separated therefrom by an air gap 70. Let it be assumed that, as seen in FIG. 5, a North pole of the magnet ring 14 is opposite the flux guide element 60, then flux will pass over the air gap 62, the horizontal portion 61 of the flux guide element 60, the vertical portion 66 and then through the Hall generator 16" and its carrier to the flux guide element 68, over air gap 70 and return through the lower edge of the rotor bell 13 to the South pole of the ring magnet 14. The flux guide element 60 thus acts as a flux concentrator, that is, the flux density or induction in the Hall generator 16' is increased with respect to that existing in the air gap 62.

Hall generator 16', and particularly its flux guide element 60, is located in the space between two stator pole windings 45 which are free from the windings themselves, that is, it is quite close to the pole tips of adjacent pole shoes, and specifically located within a gap 24. Thus, in operation, leakage flux from the stator laminations 61 will affect the Hall generator 16'. This is illustrated schematically in FIG. 3 by the arrows directed towards the Hall generator 16'. $B_{rotor}$ is the flux acting from the ring magnet on the Hall generator 16'. In operation, this induction of flux is superimposed on the induction $B_{S2}$ from the tip of the pole $23^{III}$ if current flows in one of the filaments 40 or 41. The flux $B_{S2}$ acts in the same direction as the rotor flux $B_{rotor}$.

Simultaneously, in operation, a flux $B_{S1}$ will act on the Hall generator 16' derived from the tip of the pole $23^{II}$. The extension 63 now ensures that the flux $B_{S1}$ from the pole tip $23^{II}$ is larger at any instant of time than $B_{S2}$. Since $B_{S1}$ has the opposite direction, the net effect will be that a negative feedback will act on the magnetic circuit of the motor to affect the Hall generator 16'. The excess of negative feedback means that, if the rotor magnet 14, as shown, has a North pole acting on the Hall generator 16', the overall effect of the leakage flux acting from the stator lamination stack 21 on the Hall generator 16' will always have the characteristic of a South pole and vice versa (if a rotor-South pole is opposite the Hall generator 16' so that, then, the stator stack leakage flux will have the effect of a North pole). The alternating leakage flux field $B_{S1}$ and the alternating leakage flux field $B_{S2}$ which affects the Hall generator 16', and emanating from adjacent stator poles, ensures smooth motor operation. For cheaper embodiments the Hall-generator and flux-conductors might be substituted by a Hall-IC.

In operation, a further leakage field occurs at thestator poles which, however, does not change its direction but only its intensity, that is, having a pulsing component. This leakage flux undesirably affects commutation of the motor current. The present invention is particularly directed to reduce this unidirectional pulsing leakage field, and reference will now be made to FIGS. 6 to 8 and 11 and 12.

Figure 6:
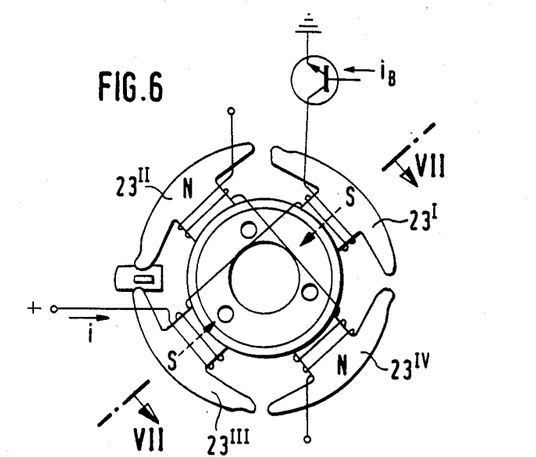
FIG. 6 is a highly schematic top view in which all unnecessary elements have been eliminated, and used in connection with an explanation of the principle of the present invention.
Figure 7:
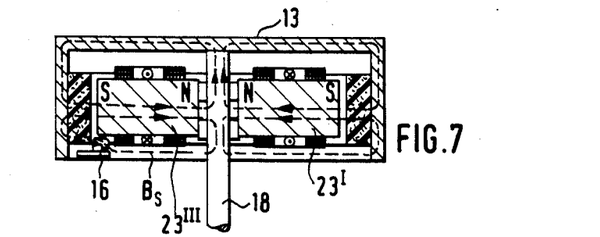
FIG. 7 is a section along lines VII—VII of FIG. 6, likewise highly schematic.

FIG. 6 does not form part of the present invention but is used for an explanation thereof. FIG. 6 shows the two stator pole windings of one filament of diametrically opposite stator poles $23^{I}$ and $23^{III}$ and, respectively, $23^{II}$ and $23^{IV}$. The stator pole windings are serially connected. In low-voltage motors, parallel connection is also possible. If the windings in the poles $23^{I}$ and $23^{III}$ are energized then, as shown, these two pole will each have a South pole. The stator poles $23^{II}$ and $23^{IV}$ will then become North poles. The substantial leakage fluxes which arise are shown in highly schematic form in FIG. 7. Thes leakage fluxes pass through the motor shaft 18 and the region of the stator lamination stack 21 surrounding the shaft 18. The direction of magnetization, that is, the resulting polarity in independent on energization of the filament 40 or 41, respectively; in other words, the respectively energized stator pole will always become a South pole and the shaft 18 will become a North pole.

Figure 8:
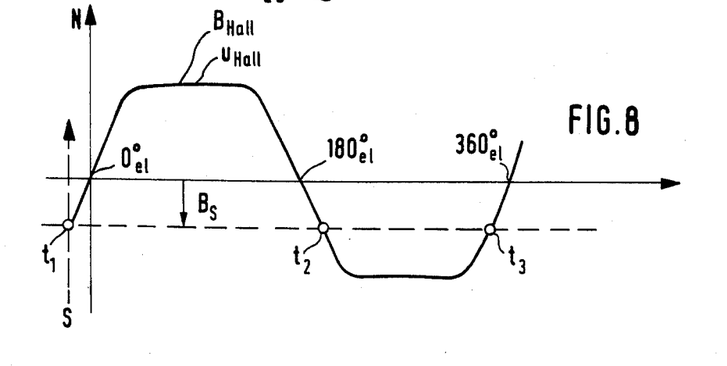
FIG. 8 is a flux-rotor position diagram used in connection with the explanation of the operation of the motor, and the principle of the invention.

This stray leakage flux results in a leakage flux $B_S$ which will also pass through the galvano-magnetic sensor 16 and will falsify the output signal, as can be seen in connection with FIG. 8. Without the leakage flux $B_S$, the flux $B_{Hall}$ on the Hall generator, and thus the voltage $u_{Hall}$, will be symmetrical to the x-axis, that is, there will be no substantial d-c component. Commutation will occur, each time, at about 0°-el., 180°-el., 360°-el., etc. This leakage flux is unidirectional in the motor shaft.

Figure 11:
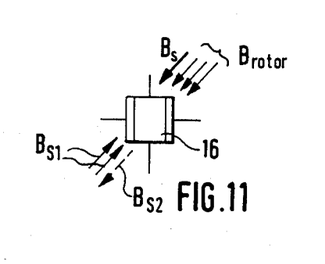
FIGS. 11 and 12 are two diagrammatic illustrations used in connection with the explanation of the present invention and illustrating the effect of stray magnetic fluxes on the galvano magnetic element forming the rotor position sensor.
Figure 12:
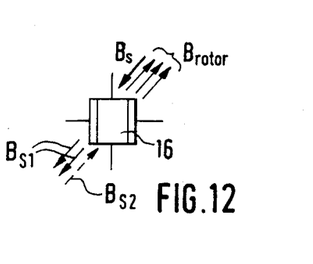

The leakage flux $B_S$, however, adds a d-c component to the Hall voltage $u_{Hall}$ (considered in the sense of Fourier analysis) which, in net effect, can be shown as a shift of the coordinates. The commutation time instants, $t_1$, $t_2$, $t_3$, etc., then are no longer equidistant from each other; further, the switching or commutation cycles are interfered with since $B_S$ has a pulsing component in dependence on motor current. This is shown once more schematically in FIGS. 11 and 12, in a representation similar to that of the arrows in FIG. 3. As seen in FIG. 11, the leakage flux $B_S$ is additive with respect to the rotor flux, resulting in delayed commutation; in FIG. 12, the leakage flux $B_S$ is subtracted from the flux of the rotor, resulting in commutation which will occur too early. The result is commutation at the wrong time instant, and starting of the motor is not ensured from all starting positions. The four-pole motor, as shown, has four quiescent or starting positions which it can reach when stopped, and starting must be ensured from all four positions.

Figure 9:
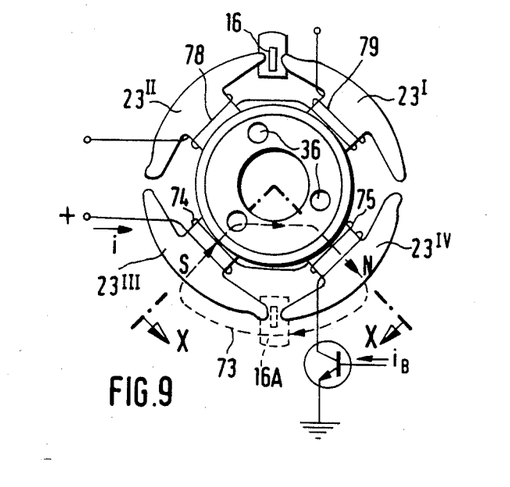
FIG. 9 is a second embodiment of an arrangement of windings, suitable for an even number of pole pairs.
Figure 10:
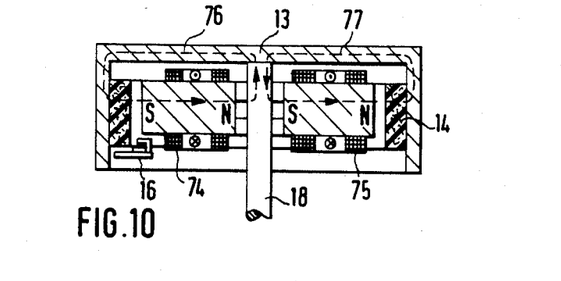
FIG. 10 is a section along the broken section lines X—X of FIG. 9, in which it is to be noted that the section line extends at right angles through the center of rotation of the motor.

In accordance with the present invention, the motor is so constructed that the leakage flux $B_S$ is effectively eliminated, and reference will be made to FIGS. 9 and 10: In accordance with the invention, an even number of stator pole windings of sequential stator poles are connected together so that, at the circumference of the respectively energized stator poles, as many North poles as South poles will be obtained, which generate equal, but opposite magnetic fluxes. The result will be a relatively short magnetic circuit 73 which is illustrated in FIG. 9 for the poles $23^{III}$ and $23^{IV}$. The ampere-winding distribution is fairly uniform, so that only low leakage flux will result. The stator pole windings 74, 75 of one of the filaments will have current flow therethrough resulting in this low stray flux. The stray fluxes 76, 77 are of opposite direction in the shaft 18 and thus will buck or cancel each other therein, so that the stray flux $B_S$ acting on the sensor 16 is markedly reduced, that is, is reduced to such an extent that it no longer interferes with generation of suitable commutation signals by the galvano-magnetic sensor 16, typically the Hall generator 16'. The winding of one filament are shown at 76, 77, the windings of the other filament at 78, 79.

The torque acting on the rotor is generated, alternatingly, on the one side of the rotor 13, 14, and then on the other. This places particularly high requirements on the quality of the bearing of the rotor, for example on the shaft 18. The extension 63 of the sensor 16 can be effective only if the stator poles $23^I$ and $23^{II}$—in the example—are energized. If negative feedback leakage flux is desired, obtained by the extension 63 for the upper filaments 78, 79 to switch the sensor 16 between the poles $23^I$ and $23^{II}$, it will then be necessary to place a sensor 16A between the poles $23^{III}$ and $23^{IV}$ and use the sensor 16A to control commutation of the lower filament having windings 74, 75. Each Hall generator, therefore, is used only to half its effectiveness, since each Hall generator, separately, will control only one filament, and only one of its output signals is used. This increases the cost of the motor since, now, two Hall generators would be required.

The structure of FIG. 2, therefore, is preferred in which, all four stator poles $23^I$ to $23^{IV}$ are alternatingly energized so that, in operation, two North poles and two South poles will be generated synchronously at the circumference of the energized stator poles, which have equal flux, but of opposite direction, so that the overall flux at the center of the motor is approximately zero. The flux in the shaft 18 then will have the same flux distribution therein as shown in FIG. 10. The shaft 18, however, will have the stray leakage fluxes of all stator poles, that is, in FIG. 2 from four stator poles, of which half is directed upwardly and half is directed downwardly so that, overall, the fluxes will cancel each other. This arrangement substantially reduces the stray flux $B_S$ affecting the sensor 16 so that it is no longer interfering, and ensures reliabl starting from any rotor position. The extension 63 acts to ensure soft switching of the current between the two filaments 40, 41 of the stator winding since, upon energization of the filament 40, it receives a leakage flux as well as upon energization of the filament 41.

The torque is generated continuously over the entire circumference of the rotor, so that the bearing is not loaded with radially pulsing forces, and thus the requirements placed on the quality of the bearing can be reduced.

The solution according to FIG. 2 can be used with motors having pole pair numbers p=2, 3, 4, 5 . . . ; the solution in accordance with FIG. 9 can be used only with even numbers of pole pairs, that is, p=2, 4, 6, 8 . . .

The invention has been described in connection with serially connected windings of any filament. The windings can be connected in parallel as well, or a combination of series-parallel connections can be made. The series circuit, as shown in FIG. 2 has the advantage of low manufacturing costs, particularly if the windings are constructed in bifilar form.

Various changes and modifications may be made, and features described in connection with any one of the embodiments may be used with any of the others, within the scope of the inventive concept. It is also pointed out that the present invention preferably applies to brushless motors receiving only two current pulses per rotation of 360° electrical.

The invention is particularly applicable for external rotor motors, in which the rotor preferably has a ring-shaped permanent magnet within a pot-shaped rotor body. The rotor body forms a magnetic return path for the permanent magnet and thus is made of soft magnetic material (as shown, for example, in FIG. 1). Such a rotor body together with the ferromagnetic shaft of the motor and a stator lamination stack may undesirably enhances a non-symmetrical magnetic field which may possibly be present. It is thus particularly important to avoid asymmetric magnetic fields, which is accomplished by the arrangement of the stator winding in accordance with the invention.

The elimination of stray magnetic fields is particularly important when motors of this type are to be used in combination with external apparatus which is magnetically sensitive, for example magnetic tape, transducing apparatus or disk memories, especially with hard disks and the like. The motor can be used for direct drive of tape recorder capstans video tape recording scanning heads, and the like, and located closely adjacent the magnetic transducing apparatus and/or the tape without requiring substantial magnetic shielding or interfering with the signals being transduced from or to the magnetic tape by the magnetic transducing heads.

Figure 13:
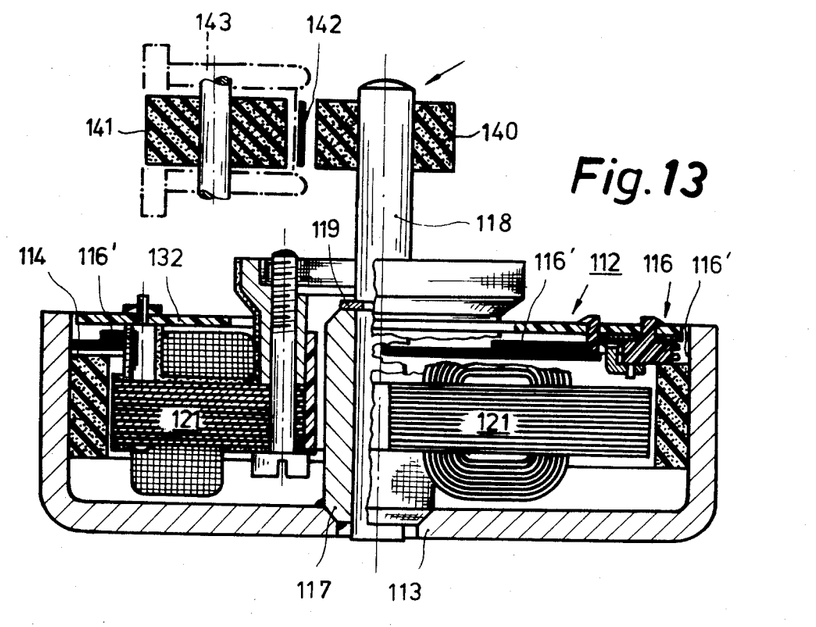
FIG. 13 is a highly schematic view similar to FIG. 1, utilizing an optical rotor position sensor.

FIG. 13 illustrates an embodiment of the invention in which the motor is used in combination with a magnetic field sensitive component positioned closely adjacent to the motor. for purposes of illustration, FIG. 13 shows a tape transducing head 143 to transduce signals to or from a magnetic tape 142 which is guided in a tape transducing path between two guide wheels 140, 141. The wheels are shown separated for better illustration. In actual operation, wheels 140, 141 will pinch tape 142 therebetween, so that wheel 140 will form a drive capstan for the tape 142. The wheel 141, suitably journaled on a shaft in accordance with well known construction functions as an idler or presser wheel.

The motor of FIG. 13 is essentially similar to that of FIG. 1 or 2, and similar parts have been given the same reference numerals, incremented by 100.

Motor 112—as the motor of FIGS. 1 and 2—is a four-pole brushless external rotor motor having two filaments or conductor paths arranged for pulse energization. The rotor body 113 is bell or pot-shaped; a four-pole permanent magnet ring 114 is adhesively secured in the shell. The magnetization is trapezoidally-shaped. Ring 114 preferably is an elastomer-bound barium-ferrite.

The rotor position is sensed by an opto-electronic sensor 116, scanning a black/white track 116'. The black/white track is in stripe form—see FIG. 13—applied, for example, to the interior of the external rotor bell 13. The optoelectronic sensor 116 is secured to a printed circuit board or similar support plate 132 which, in turn, is secured to the stator lamination package 121.

A sleeve 117 is secured centrally within the bell 113 into which the rotor shaft 118 is inserted until a C-ring 119 engages the sleeve 117. The sleeve 117 is attached, for example, by welding. Shaft 118 is suitably journaled in the sleeve 117 by bearings, not shown.

The capstan drive wheel 140 for the tape is secured to the shaft 118 to drive tape 142 in combination with the counter or presser wheel 141. The transducer head 143 is provided to record on, or transduce signals from tape 142. Tape 142 can be of any suitable type, for example a magnetic data record carrier video tape, recorder, or the like. The transducing section can be in accordance with any well known structural arrangement for various purposes.

The respective stator poles of the lamination package 121 are identical to poles 23$^I$ to 23$^{IV}$ of FIG. 2. The winding, also, is identical thereto as described therein or in connection with FIG. 9, so that the leakage flux generated by the magnetic fields of the stator windings which carries current at any instant of time will cancel. This substantially reduces leakage flux emanating from the motor and reaching the magnetically sensitive components, in FIG. 13 the magnetic tape 142 and the transducer head 143. Thus, in a simple manner and without possibly any or at least substantial magnetic shielding, degradation, distortion or adulteration of information, data or signals recorded on the magnetic tape 142, and/or arising in the transducer head 143, is effectively prevented.

The opto-electronic sensor 116 is immune to magnetic fields and its position closer to the magnetically sensitive utilization apparatus—tape 142 and transducer 143 in FIG. 13—thus does not introduce any stray magnetic field emanating from the sensor itself. The use of opto-electronic scanning means, rather than a galvanomagnetic sensor, such as a Hall generator, is not strictly necessary but contributes, additionally, to practically complete absence of stray magnetic fields from the motor, or any fields particularly unidirectionally arising within tha shaft of the motor (as shown in FIG. 6) which might interfere with other magnetically sensitive apparatus, for instance those of a video-recorder or a head of a hard-disc-storage and the like.

The invention has especial meaning for external-rotor motors, whose rotors preferably comprise an annular permanent magnet and a cup-like rotor body, the rotor body simultaneously serving as magnetic yoke for the permanent magnet and being therefore manufactured from a soft-magnetic material (as depicted in e.g. FIG. 1). Such a rotor body forms together with the iron shaft and the stator stack a magnetic circuit which is undesired manner favors any asymmetrical magnetic field that happens to be present. Therefore with such a construction it is especially important to avoid, by means of an inventive arrangement of the stator winding, asymmetrical magnetic fields.

I claim:

1. Brushless d-c cylindrical air gap motor (12) having
   a permanent magnet rotor (13, 14);
   a stator (22);
   two-filament winding means (40, 41) on said stator;
   core elements (21) for said winding means and having part-circumferentially extending stator pole shoes (23) leaving gaps (24) between the ends of adjacent pole shoes,
   said winding means being adapted to be selectively energized by a controllable current source (48, 49, 47, 54);
   a galvano-magnetic sensor (16) responsive to the magnetic field from the rotor and providing output signals representative of the position thereof to control said controllable current source to energize the respective winding means of the core elements;
   wherein, in accordance with the invention,
   the stator (22) is at least a four-pole stator;
   each filament (40, 41) of the winding means (45; 74, 75; 78, 79) associated with respective stator poles being so wound on the stator core elements and so energized that the number of North poles and South poles arising at the circumference of the core elements upon simultaneous energization of the respective filament is identical and the sum of magnetic flux at the circumference of said core elements—as it faces said air-gap—due to said energization of the respective filament is essentially zero, whereby unidirectional leakage flux from the motor and acting on the galvano-magnetic sensor is substantially reduced or eliminated,
   further including a flux concentrating flux guide element (60) in flux linkage relation to the galvanomagnetic sensor, said flux concentration element having an extension portion (63) extending in the direction of rotation (26) of the motor for preferred capture of stray magnetic flux ($B_{S1}$) of the stator pole (23$^{II}$) subsequent—in the direction of rotation—to the sensor (16).

2. In a brushless d.c. cylindrical-air-gap motor, in combination,
  a permanent-magnet rotor having at least four rotor poles;
  a stator having at least four stator poles and including a winding system;
  the winding system comprising at least one phase winding which comprises a plurality of stator coils located at said stator poles electrically connected together for simultaneous energization and simultaneous deenergization,
  all the stator coils of the motor being so located that the angular spacing between the midpoints of any two angularly spaced stator coils is substantially equal to 180 electrical degrees times an integer, an integer being any whole number including one,
  the respective stator coils of each such phase winding being so located that, upon energization of the phase winding, the stray flux emanating from half of the stator coils of the phase winding cancels to a substantial degree the stray flux emanating from the other half of the stator coils of the phase winding at a generally radially extending region of reduced total stray stator flux located approximately midway between two adjoining stator poles;
  and a magnetic-flux-sensitive semiconductor element which is located at a sensing location close to the path of movement of the rotor poles, whereby to sense the passage of successive rotor poles and produce a rotor-position signal useful for commutating the winding system, said sensing position of said magnetic-flux-sensitive element furthermore being located within said generally radially extending region, whereby said magnetic-flux-sensitive element is to a reduced degree influenced by the stray flux emanating from the various stator poles during operation of the motor.

3. A motor as defined in claim 2,
  all the stator coils of the winding system being so arranged that no stator coil overlaps an adjoining stator coil, the spacing from the midpoint of one stator coil to the midpoint of the adjoining stator coil being always 180 electrical degrees.

4. A motor as defined in claim 3,
  the winding system comprising a total of two such phase windings,
  the number of stator coils in one of the two phase windings being equal to the number of stator coils in the other of the two phase windings,
  each stator coil of one phase winding being located spatially coincident with one respective stator coil of the other phase winding.

5. A motor as defined in claim 4, the stator coils of one phase winding being connected together in series, and the stator coils of the other phase winding being connected together in series.

6. A motor as defined in claim 5, each pair of spatially coincident stator coils being constituted by a bifilar-wound pair of conductors.

7. A motor as defined in claim 4, each pair of spatially coincident stator coils being constituted by a bifilar-wound pair of conductors.

8. A motor as defined in claim 4,
  the number of pairs of spatially coincident stator coils being equal to the number of stator poles,
  the respective stator coils of each phase winding being of alternate successive polarity, such that when one phase winding is in energized condition its constituent stator coils are, in spatial succession, of north magnetic orientation, the next one of south magnetic orientation, the third one of north magnetic orientation, and so forth.

9. A motor as defined in claim 2,
  the magnetic-flux-sensitive element being so located within said generally radially extending region that during energization of said winding system the sum of the stator fluxes emanating from the energized stator poles and incident upon said element is essentially zero.

10. A motor as defined in claim 2,
  said stator being of the type designed to present to said rotor poles a magnetic reluctance which varies in dependence upon the angular position of the rotor, whereby the motor produces during rotor rotation a reluctance torque whose magnitude and direction are such a function of the angular position of the rotor as to supplement the electromagnetically generated torque produced when the stator coils are energized.

11. A motor as defined in claim 10, said stator having a peripheral surface facing the rotor which is of varying radius.

12. A motor as defined in claim 11, said stator having a peripheral surface facing the rotor which is of continuously varying radius.

13. A motor as defined in claim 10, the rotor poles having surfaces which face the peripheral surface of the stator and which are of constant radius.

14. A motor as defined in claim 10, each rotor pole exhibiting a trapezoidal magnetization pattern.

15. A motor as defined in claim 2, the rotor being an external rotor and the stator being an internal stator.

16. In a brushless d.c. cylindrical-air-gap motor, in combination,
  a permanent-magnet external rotor having a total of four rotor poles;
  an internal stator having a total of four salient poles consisting in succession of a first, a second, a third and a fourth stator pole,
  each stator pole being of generally T-shaped outline and comprising a radially outer pole shoe portion facing towards the rotor poles and extending in the circumferential direction for an angular span approximately the same as the angular span of a rotor pole and also comprising a radially inward stem portion around which a stator coil can be wound,
  the stator being of the type designed to present to the rotor poles a magnetic reluctance which varies in dependence upon the angular position of the rotor, producing during rotor rotation a reluctance torque whose magnitude and direction are a function of the angular position of the rotor such as to supplement the electromagnetically generated torque that can be produced upon energization of the stator poles;
  a winding system on the stator consisting of a first phase winding and a second phase winding,
  each phase winding consisting of four stator coils electrically connected together for simultaneous energization and simultaneous deenergization, the four stator coils of each phase winding being each wound around the stem portion of a respective one of the four stator poles,
  each of the two phase windings having a respective first terminal and a respective second terminal, the first terminals of the two phase windings being connected together to form a common terminal, so that if current flows through said common terminal in a predetermined direction and also through said first phase winding the latter will assume its energized state, and if current flows through said common terminal in said predetermined direction and also through said second phase winding the latter will assume its energized state, the four stator coils of the first phase winding having alternate winding directions, such that if the first phase winding assumes said energized state thereof the coils of this phase winding magnetize the first and third stator poles with north polarity and the second and fourth stator poles with south polarity, the four stator coils of the second phase winding having alternate winding directions, such that if the second phase winding assumes said energized state thereof the coils of this phase winding magnetize the first and third stator poles with south polarity and the second and fourth stator poles with north polarity, the two stator coils on each stator pole, one belonging to the first and the other to the second phase winding, being constituted by a bifilar-wound pair of conductors, the four stator coils of each phase winding, because located and of the winding directions defined above, having the effect that, when the respective phase winding assumes said energized state thereof, the stray flux attributable to the stator coils of this phase winding on the first and second stator poles cancels to a substantial degree the stray flux emanating from the stator coils of the same phase winding on the third and fourth stator poles at a generally radially extending region of reduced total stray stator flux located approximately midway between the first and fourth stator poles;

and a magnetic-flux-sensitive semiconductor element which is located at a sensing position close to the path of movement of the rotor poles, whereby to sense the passage of successive rotor poles and produce a rotor-position signal useful for commutating the winding system, said sensing position of said magnetic-flux-sensitive element furthermore being located within said generally radially extending region, whereby said magnetic-flux-sensitive element is to a reduced degree influenced by the stray flux attributable to the various stator coils during operation of the motor.

17. A motor as defined in claim 16,
the stator coils of one phase winding being connected together in series, the stator coils of the other phase winding being connected together in series.

18. A motor as defined in claim 16,
the magnetic-flux-sensitive element being so located within said generally radially extending region that during energization of said winding system the sum of the fluxes emanating from the stator and incident upon said element is essentially zero.

19. A motor as defined in claim 16, the stator having a peripheral surface facing the rotor which is of varying radius.

20. A motor as defined in claim 16, the peripheral surface of the stator being of continuously varying radius.

21. A motor as defined in claim 16, the rotor poles having surfaces which face the peripheral surface of the stator and which are of constant radius.

22. A motor as defined in claim 16, wherein the rotor poles each exhibit trapezoidal magnetization pattern.

* * * * *

UNITED STATES PATENT AND TRADEMARK OFFICE
CERTIFICATE OF CORRECTION

PATENT NO. : 4,547,714

DATED : October 15, 1985

INVENTOR(S) : Rolf Müller

It is certified that error appears in the above-identified patent and that said Letters Patent is hereby corrected as shown below:

On the title page, after the data at item [63], but before item [51], kindly insert the following:

-- [30]   Foreign Application Priority Data

Aug. 11, 1978 [DE]  Fed. Rep. of Germany .....2835210   --.

Signed and Sealed this

Twenty-ninth Day of July 1986

[SEAL]

Attest:

DONALD J. QUIGG

Attesting Officer

Commissioner of Patents and Trademarks